(12) United States Patent
Sutterlin et al.

(10) Patent No.: US 6,301,290 B1
(45) Date of Patent: Oct. 9, 2001

(54) ADAPTIVE REFERENCE PATTERN FOR SPREAD SPECTRUM DETECTION

(75) Inventors: Philip H. Sutterlin, Saratoga; J. Marcus Stewart, San Jose, both of CA (US)

(73) Assignee: Echelon Corporation, Sunnyvale, CA (US)

( * ) Notice: Subject to any disclaimer, the term of this patent is extended or adjusted under 35 U.S.C. 154(b) by 0 days.

(21) Appl. No.: 09/017,523

(22) Filed: Feb. 2, 1998

Related U.S. Application Data

(62) Division of application No. 08/580,623, filed on Dec. 29, 1995, now Pat. No. 5,748,671.

(51) Int. Cl.⁷ .......................... H04L 27/30; H04B 1/707
(52) U.S. Cl. ................................. 375/150; 375/343
(58) Field of Search ..................... 375/260, 343, 375/346, 367, 130, 139, 142, 143, 150, 152

(56) References Cited

U.S. PATENT DOCUMENTS

| | | | |
|---|---|---|---|
| 4,390,980 | * 6/1983 | Brown | 370/203 |
| 4,550,414 | * 10/1985 | Guinon et al. | 375/207 |
| 4,930,140 | * 5/1990 | Cripps et al. | 370/342 |
| 4,979,183 | 12/1990 | Cowart . | |
| 5,022,047 | * 6/1991 | Dixon et al. | 375/208 |
| 5,077,753 | * 12/1991 | Grau, Jr. et al. | 375/200 |
| 5,081,645 | 1/1992 | Resnikoff et al. . | |
| 5,090,024 | 2/1992 | VanderMey et al. . | |
| 5,093,841 | * 3/1992 | Vancraeynest | 375/206 |
| 5,195,098 | 3/1993 | Johnson et al. . | |
| 5,228,055 | * 7/1993 | Uchida et al. | 375/208 |
| 5,263,050 | 11/1993 | Sutterlin et al. . | |
| 5,278,862 | 1/1994 | VanderMey et al. . | |
| 5,289,498 | 2/1994 | Hurlbut et al. . | |
| 5,359,625 | 10/1994 | VanderMey et al. . | |
| 5,396,515 | * 3/1995 | Dixon et al. | 375/208 |
| 5,461,629 | 10/1995 | Sutterlin et al. . | |
| 5,471,507 | 11/1995 | Awata et al. | 375/340 |
| 5,579,335 | 11/1996 | Sutterlin et al. | 375/200 |

\* cited by examiner

Primary Examiner—Young T. Tse
(74) Attorney, Agent, or Firm—Blakely Sokoloff Taylor & Zafman LLP

(57) ABSTRACT

A receiver for detecting spread spectrum binary data particularly on a power line in the presence of channel distortion. In one embodiment a standard pattern ideally suited for minimal distortion in the channel is used in conjunction with an alternate pattern which is developed to better detect carrier and data in the presence of certain channel distortion. The receiver switches between the standard and alternate pattern to provide improved detection. In another embodiment an adaptive pattern is used which is developed from the receive signal. For instance, the signal over several bit times is averaged to provide a pattern which is correlated with a receive signal.

2 Claims, 7 Drawing Sheets

ADAPTIVE REFERENCE PATTERN FOR SPREAD SPECTRUM DETECTION

This is a division application of Ser. No. 08/580,623, filed Dec. 29, 1995, now U.S. Pat. No. 5,748,671.

BACKGROUND OF THE INVENTION

1. Field of the Invention

The invention relates to the field of spread spectrum communication.

2. Prior art

Digital communications over power lines as well as other media using a spread spectrum signal which relies on correlation for the detection of the digital signals is well known. For example, see U.S. Pat. No. 4,979,183. Other examples of such communications can be found in U.S. Pat. Nos. 5,289,498; 5,263,050; 5,090,024; 5,278,862 and 5,359,625.

The spread spectrum signal can in some cases be distorted, particularly on power lines. For example, a power supply in a television can sufficiently distort the signal to cause misdetection. In co-pending application Ser. No. 08/534,574, filed Sep. 27,1995, now U.S. Pat. No. 5,579,335, entitled "Split Band Processing for Spread Spectrum Communications" (assigned to the Assignee of the present invention) an apparatus and method are described for dealing with the distortion by, in general terms, dividing or splitting the broad band, spread spectrum signal into sub-bands and separately processing the sub-bands before recombinating the sub-bands.

The present invention provides another method and apparatus where the reference pattern used for detecting data is altered either by using different patterns or by using an adaptive pattern.

SUMMARY OF THE INVENTION

The invention describes several different patterns for use in correlation with a received signal in a spread spectrum system. In one embodiment, a standard reference pattern is used with an alternate pattern selected to provide higher correlation values in the presence of certain channel distortion. In another embodiment, samples from the received signal are used to provide an adaptive correlation reference signal. Other embodiments are described in the detailed description of the invention.

DETAILED DESCRIPTION OF THE PRESENT INVENTION

A method and apparatus are described for improving performance in a spread spectrum system, particularly one which transmits data over a power line. In the following description, numerous specific details are set forth such as a specific number of samples in order to provide a thorough understanding of the present invention. It will be apparent, however, to one skilled in the art that the present invention may be practiced without these specific details. In other instances, well-known correlation techniques are not described in detail to prevent the present invention from being obscured.

SOURCE OF DISTORTION ON POWER LINE

Distortion of a spread spectrum signal transmitted over a power line can make it difficult to detect the presence of a valid spread spectrum signal (i.e., carrier) and binary data. It is helpful to understand the cause and characteristics of this distortion before understanding the details of the present invention.

Figure 1A:
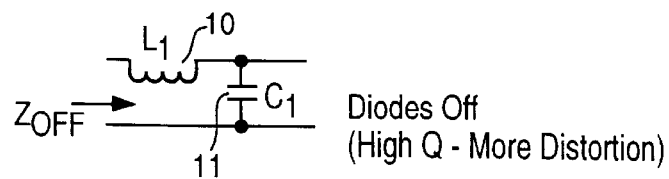
FIG. 1A illustrates an LC circuit coupled to a power line.
Figure 1B:
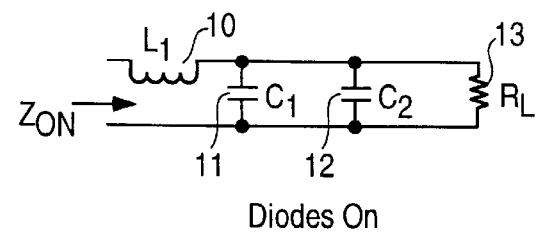
FIG. 1B illustrates the network of FIG. 1 when diodes are conducting and an additional impedance is coupled to the power line.

In FIG. 1A inductor 10 and capacitor 11 are illustrated. These represent the inductance of a power cord of an appliance or the like having a DC power supply and the EMC capacitor often found across the supply side of diodes in the power supply. With the diodes off (nonconducting) the inductor 10 and capacitor 11 create a relatively high Q circuit which can provide a relatively large source of distortion for spread spectrum signals on a power line. When the diodes conduct as represented in FIG. 1B, there is additionally a capacitor 12 used to filter the DC output from the diodes and a load represented by the resistor 13. The resistor 13 provides substantial damping to the circuit thereby lowering the Q of the circuit and the associated distortion. Since the diodes turn "on" and "off" during the AC cycle, the distortion exhibits a time-varying nature that is dependent on the frequency of the AC line.

Figure 3:
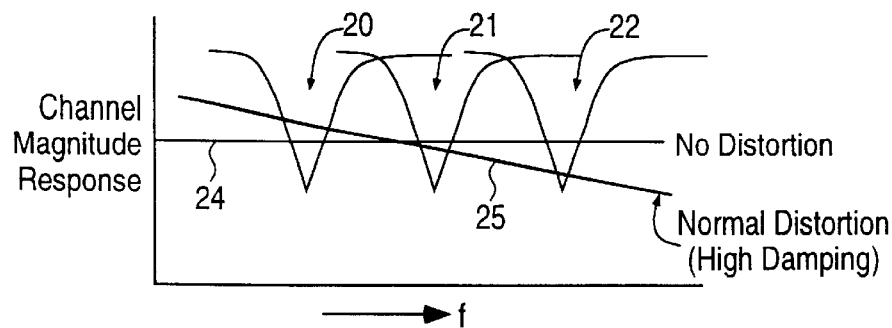
FIG. 3 is a graph illustrating channel distortion which may occur on a power line.

The channel distortion with the circuit of FIGS. 1A and 1B are shown in FIG. 3. The high Q circuit of FIG. 1A produces notch-like filter characteristics as shown by notches 20, 21 and 22. These notches and associated phase shifts cause substantial distortion to a spread spectrum signal. The frequency of the notches, since they depend on the values of L and C, may occur over the entire band used for a spread spectrum signal. In comparison line 24 represents a constant impedance that does not distort a spread spectrum signal. When the diodes conduct as illustrated by line 25 the damping provided by the load greatly reduces the amount of distortion.

Figure 2:
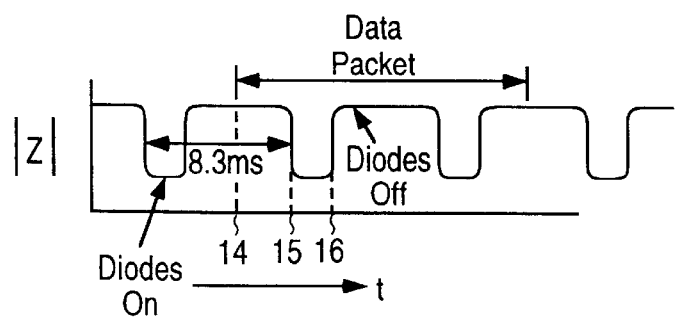
FIG. 2 is a graph used to illustrate the impedances associated with FIG. 1A and FIG. 1B.

FIG. 2 is used to illustrate when the distortion occurs for the circuit of FIGS. 1A and 1B and for an assumed frequency. In a 60 cycle power system where the diodes conduct every half cycle, the impedance shifts between two values with a periodicity of approximately 8.3 msecs. A typical data packet as shown in FIG. 2 may span two or more changes in impedance. Therefore, in designing a spread spectrum system, not only must the distortion be tolerated but the change from one level of distortion to another must also be tolerated.

EMBODIMENT OF FIG. 4

In the following description the term "bit" is used in conjunction with data bits (a binary 1 or 0) and sample bits (the quantized received signal). There are 200 sample bits for each data bit time for the following embodiments except for the embodiment of FIG. 9 which may use fewer sample bits for each data bit.

Figure 4:
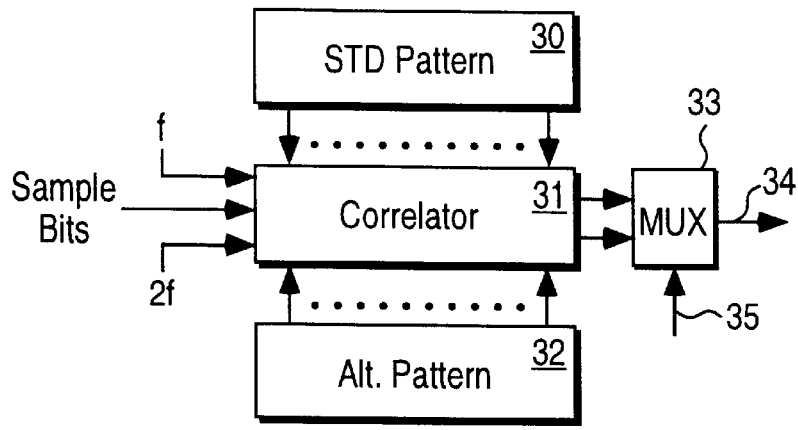
FIG. 4 is a block diagram illustrating one embodiment of the present invention where a standard pattern and an alternate pattern are used in conjunction with the correlator.

A portion of a spread spectrum receiver is shown in FIG. 4, other parts of the receiver may use well-known circuits. The correlator 31 receives an input signal which is correlated with a first pattern (standard pattern) stored in the standard pattern memory 30 and an alternate pattern stored in an alternate pattern memory 32. The output of the correlator (correlation results) are used to detect both the carrier and the data binary 1's and 0's. In some cases a dynamic threshold correlation level is used for the detection of the carrier followed by the detection of the highest correlation value appearing in a window in conjunction with other processing to detect the data binary 1's and 0's. Distortion in the communication channel affects the detection of both the carrier and the data bits. For purposes of the description below, reference is made to detection of carrier in order not to over complicate the descriptions. It will be apparent that when referring to improved methods for detecting carriers that these improvements apply to data detection as well.

The standard pattern is developed generally for an ideal waveform, that is, where a data binary 1 or 0 is transmitted over a power line having minimal distortion. This is represented by the line 24 or the line 25 of FIG. 3.

The alternate pattern 32 is a pattern which compensates for certain distortion on the power line and is developed by modeling the transmission of a data binary 1 or 0 over a power line where distortion occurs. The modeling provides a pattern representative of a transmitted 1 or 0 over the power line when the distortion on the line is represented by, for example, the notched characteristics 21 of FIG. 3. An alternate pattern is selected that is representative of typical or most typical distortion found on the power line. A pattern may be selected by modeling a plurality of different distortions and then selecting a pattern which provides the highest correlation for the distortions.

For the embodiment illustrated for FIG. 4, it is assumed that the samples of the incoming signal are clocked into the correlator at the frequency f. The incoming signal is quantized in amplitude into one bit sample (sample bits). (The sample period refers to the period at which the sample bits are introduced to the correlator and not a higher sampling rate which may occur in the "front end" of the receiver). The correlator operates at the frequency 2f allowing a correlation of both the standard pattern and the alternate pattern as each new sample bit is shifted into the correlator. Alternately, two correlators may be used, one coupled to receive the standard pattern, and the other coupled to receive the alternate pattern, in this case both correlators may operate at the frequency f.

The output of the correlator 31 is coupled to the multiplexer 33. Under control of a signal 35 the multiplexer couples to line 34 either the results of the correlation with the standard pattern or the results of the correlation with the alternate pattern.

In general, the multiplexer 33 selects the correlation with the alternate pattern when distortion is present. One strategy for selecting between the correlation with the standard pattern and the alternate pattern is shown in FIG. 6.

Figure 6:
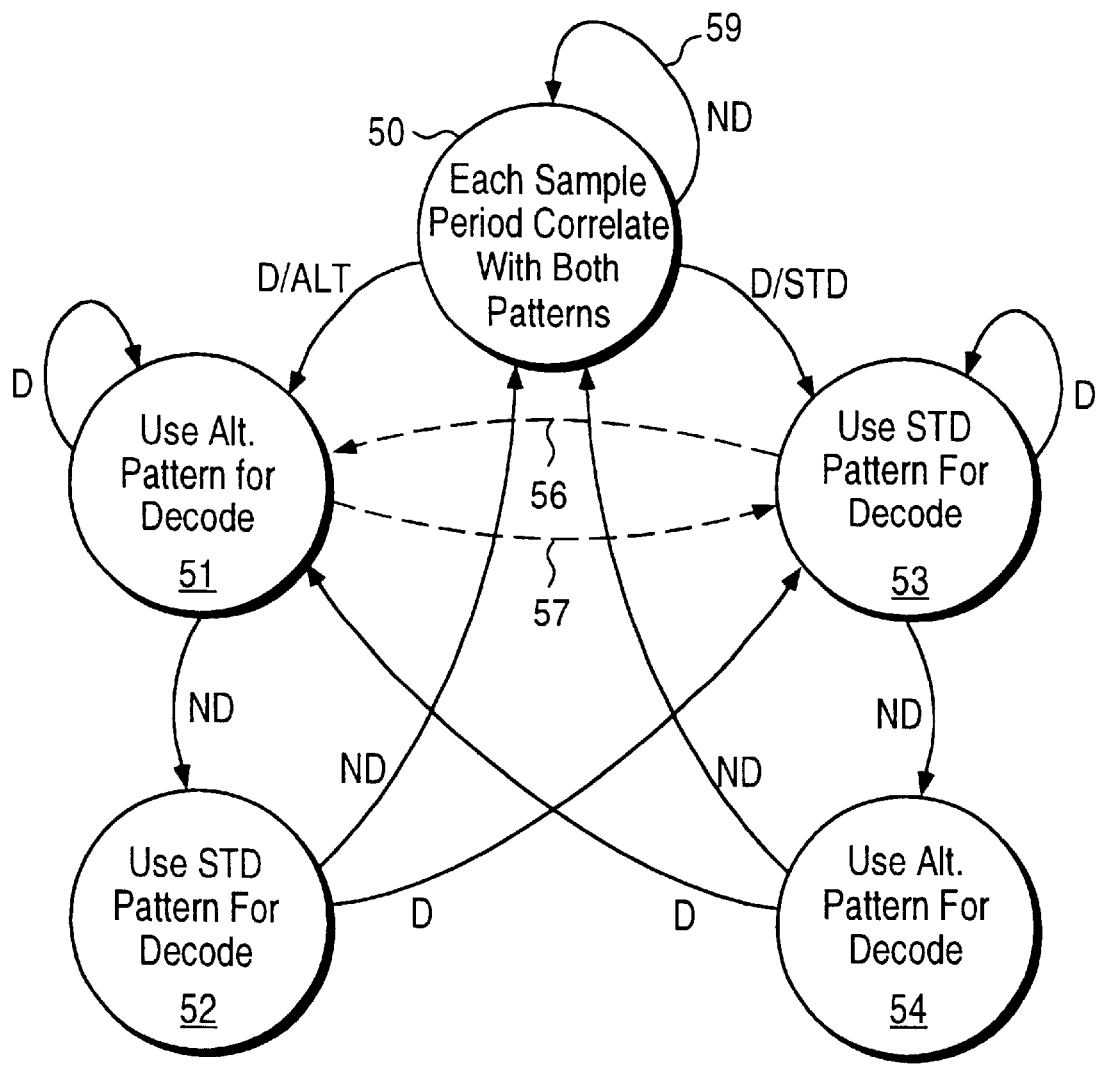
FIG. 6 is a state diagram used to describe the operation of the embodiments of FIGS. 4 and 5.

Referring now to FIG. 6, state 50 is the beginning state. In this state for each new sample bit a correlation is performed with the standard pattern and alternate pattern and the results of both correlations are sequentially coupled by the multiplexer 33 to the carrier detection circuitry (not shown). In the data bit detection circuitry the results of the correlations are examined in a well-known manner to determine if the carrier is present and if a data binary 1 or a binary 0 has been detected. If no detection (ND) occurs as indicated by line 59 the receiver remains in state 50.

If while in state 50 carrier is detected with the standard pattern, there is a change to state 53. When this occurs correlations with only the standard pattern are used for decoding data. As long as detections occur using the standard pattern, the receiver remains in state 53. Similarly, if carrier detection occurs when using the alternate pattern, there is a change from state 50 to state 51 and the receiver remains in state 51 using only the alternate pattern. (The carrier detection, data bit detection and the window used in the prior art for examining the results of the correlation are used.)

While the receiver is in state 53 and fails to detect continued presence of carrier using the standard pattern, in the second half of the sample period in which it failed to detect data bits it examines the results of a correlation with the alternate pattern. This is shown by state 54. Similarly, if the receiver is in state 51 and fails to detect data bits using the alternate pattern, it examines the results of the correlation for the same input sample bits by using the standard pattern as shown by state 52.

Referring again to state 54, if the results of the correlation with the alternate pattern fails to detect carrier there is a return to state 50. If carrier is detected while in state 54 using the alternate pattern, there is a change to state 51 and the alternate pattern is again used in the next sample period. Similarly, if while in state 52 the correlation with the standard pattern yields valid carrier, then there is a change to state 53 and if no carrier is detected, there is a return to the initial state 50.

Referring again to FIG. 2, assume a power supply such as shown in FIGS. 1A and 1B is coupled to a power line at a point that causes distortion in a transmitted signal and further that transmission begins at time 14. Prior to time 14 the receiver is in state 50. At time 14 it is more likely that a signal will be detected using the alternate pattern and that a change of state will occur to state 51 from state 50. The receiver will stay in state 51 until time 15 at which time there will be a change to state 52 and then a change to state 53. The receiver will remain in state 53 between times 15 and 16. Then at time 16 there will be a return to state 50. At time 16 there will be a change to state 54 and then a return to state 51.

As can be seen from FIG. 2, the change in distortion occurs periodically with a period of 8.3 msecs. The receiver may include a circuit for recording when the distortion level changes. If it is determined by this circuit that the level changes periodically, the receiver can switch from one pattern to the other in anticipation of the change in distortion. For example, if there is high distortion and the receiver is in state 51 and it is known from the circuit that there will be a change from high to low distortion at a particular time, the receiver may change from state 51 to state 53 as shown by line 57. This change of state may occur in anticipation of the change in distortion. Similarly, if it is known when there will be a shift from the low distortion to high distortion the receiver may shift from state 53 to state 51 as shown by line 56. Additionally, since the change in distortion may occur at such a point in time as to prevent the detection of a particular data bit, the data bit-time relationship when the change occurs can be noted and this information can be used as a hint for correcting errors. This technique is described in U.S. Pat. Nos. 5,195,098 and 5,461,629.

ADAPTIVE PATTERN

Figure 5:
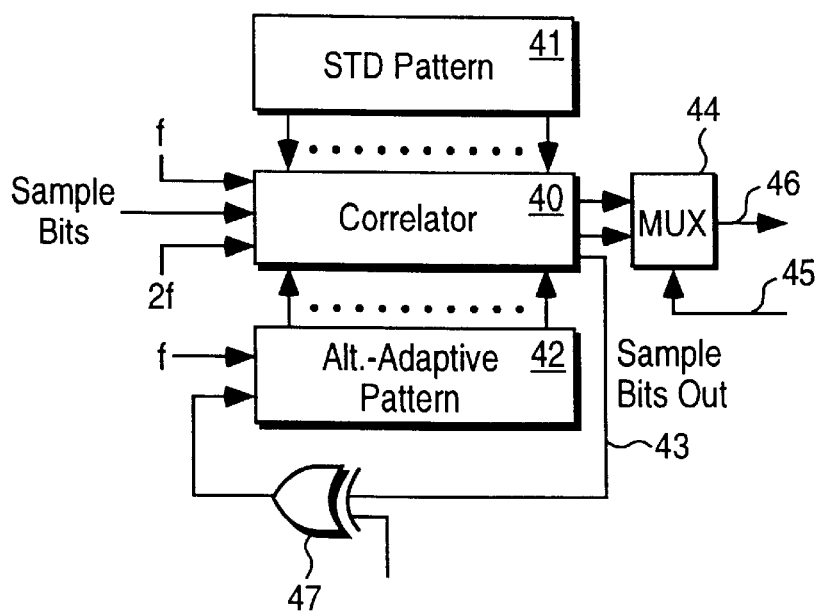
FIG. 5 is a block diagram of an alternate embodiment of the present invention where an adaptive pattern is developed from the received signal.

In another embodiment the alternate pattern is an adaptive pattern which is derived and updated from the incoming sample bits shown in the figures. This is illustrated in FIG. 5 where a correlator 40 receives the sample bits and correlates them with both the 200 bits of the standard pattern from the standard pattern memory 41 and an adaptive pattern (200 bits) from the adaptive pattern memory 42. As was the case with the embodiment of FIG. 4, the correlator 40 receives sample bits at the frequency f and correlates at the frequency 2f as each new sample bit is introduced into the correlator. Again, two separate correlators may be used operating at the frequency f. The correlation results are coupled to the multiplexer 44 and the multiplexer selects the correlation with either the standard pattern or the adaptive pattern under control of a signal on line 45. The output of the multiplexer, line 46, is coupled to standard processing circuitry for detecting carrier and the binary data bits.

As is typically the case, the signal samples are shifted from stage to stage within the correlator 40, however, when reaching the last stage of the correlator 40 the sample bits are coupled to the pattern memory 42 which comprises a shift register. Thus, where both the correlator 40 and register 42 have 200 stages and where the first stage of the correlator 40 contains sample bit $S_{n+200}$, the first stage of the pattern register 42 contains sample bit $S_n$. Therefore, the sample bits of the received signal are correlated with samples from one data bit time earlier.

The exclusive OR gate 47 in the line between correlator 40 and register 42 inverts the sample bits when one of the two binary data states are detected. This will be explained in more detail in connection with FIGS. 7, 8 and 11.

The strategy for switching between the standard pattern and the alternate-adaptive pattern may be the same as described in conjunction with FIG. 6. It may be desirable in some environments to use only the adaptive pattern and not the standard pattern.

In FIG. 5 the adaptive pattern is completely determined by the samples of the received signal coupled to register 42 on line 43. It may be advantageous in some applications to have a portion of the adaptive pattern fixed and another portion of the adaptive pattern dynamic. The fixed portion of the adaptive pattern may be the corresponding bits of the standard pattern. For instance, if bits of the alternate-adaptive pattern 1–10, 12–20 and 22–30 are fixed these bits will be the same as the bits for the corresponding bit positions of the standard pattern. If bits 11 and 21 are dynamic, these bits are derived from the sample bits of the received signal. For the described examples, the register 42 includes 200 stages and receives all of the sample bits over line 43 but only those stages forming the dynamic bits in the pattern provide outputs to the correlator. The other stages, such as stages 0–10 merely shift sample bits with no output to the correlator since the fixed pattern is used for these pattern bits. The dynamic bits of the pattern are selected as bits most likely affected by distortion.

Figure 7:
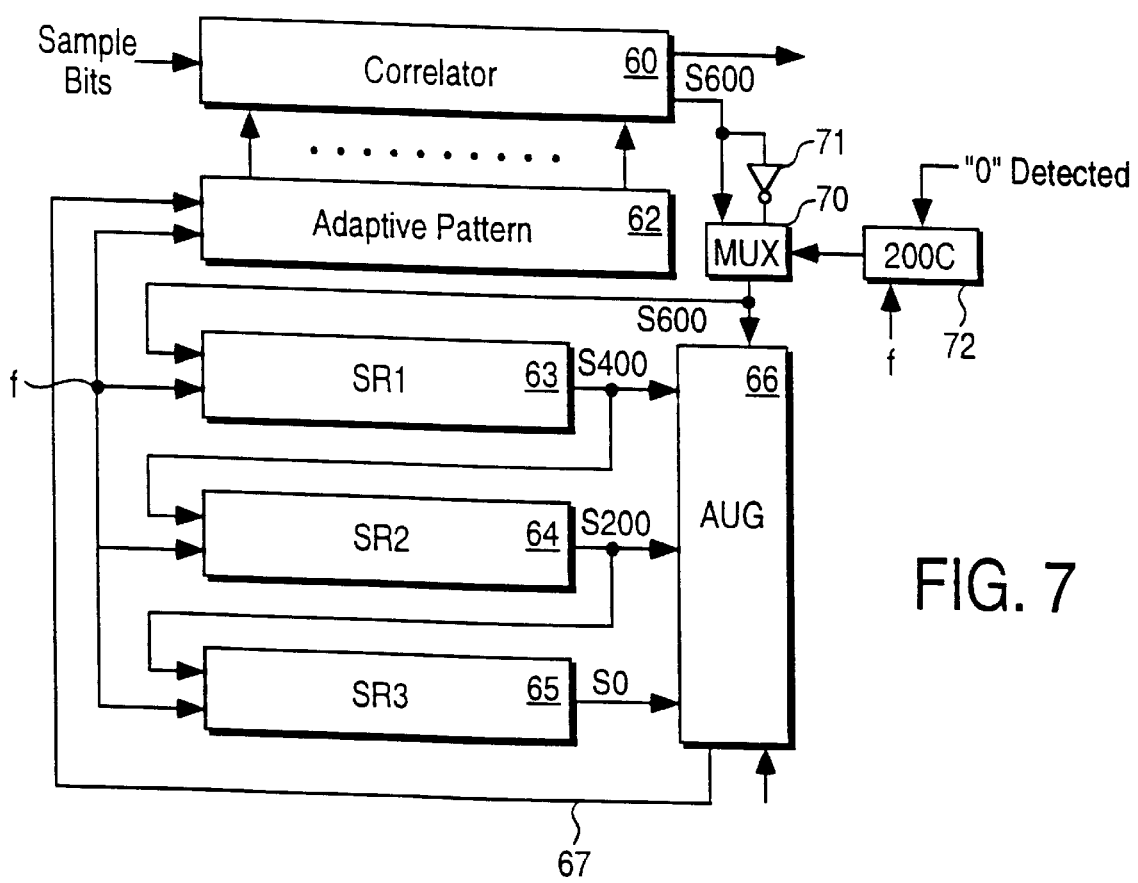
FIG. 7 is a block diagram illustrating a particular circuit for providing the adaptive pattern.

The adaptive pattern may be derived from a history of the sample bits of the received signal extending over several data bit times. In FIG. 7 several terms are shown to illustrate one averaging algorithm that can be used to average sample bits over several data bit times to develop an adaptive pattern. "S" is used to indicate a sample bit which is introduced into the correlator. The sample bits used to form the adaptive pattern are the sample bits which have passed through the correlator. That is, a sample bit is not used in determining the adaptive pattern until it exits the correlator (200 sample times after being received by the correlator for the example under discussion). One algorithm for forming the adaptive pattern relies on samples from the last four data bit times as discussed below.

Figure 8:
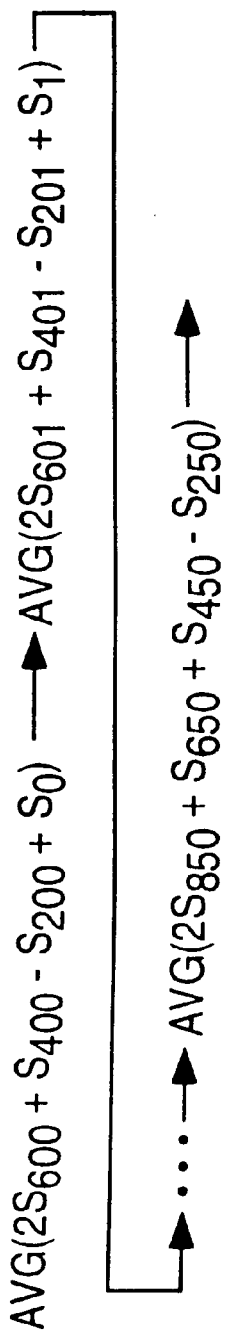
FIG. 8 are mathematical terms used to describe the operation of the circuit of FIG. 7.

Assume for sake of discussion that $S_{600}$ has just exited the correlator. This sample bit, along with $S_{400}$, $S_{200}$ and $S_0$ are used to form one bit of the adaptive pattern. As shown in FIG. 8 the average of twice $S_{600}$, $S_{400}$, $-S_{200}$, and $S_0$ are used. (The minus sign associated with $S_{200}$ indicates that the inverse of this sample bit is used as will be discussed.) Each sample bit is a binary value and since there is an odd number, the result will always be a binary 1 or a binary 0. The last sample bit from the correlator ($S_{600}$ in this case) is weighted by a factor of two.

For the receiver under discussion, a data binary 1 is represented by one bit pattern and a data binary 0 by the complement of this bit pattern. Consequently, when computing an average of bit patterns for the adaptive pattern consideration must be given to whether a data binary 0 or a binary 1 was detected. For one of these detected data bits the computation must use an inverse. Specifically, it is assumed that if a data binary 0 is detected, the samples in the correlator representing the data binary 0 are all inverted before being averaged with other sample bits. Thus, in examining FIG. 8, assume that a data binary 0 was detected when $S_{200-399}$ were in the correlator. Then "$-S_{200}$" is used to form the average for the first bit in the adaptive pattern shown in FIG. 8. The next bit in the adaptive pattern as shown in FIG. 8 uses $S_{601}$, $S_{401}$, $-S_{201}$ and $S_1$. Again the last receive sample bit $S_{601}$ is weighted by a factor of two and $S_{201}$ is inverted since a data binary 0 was detected. Lastly as shown in FIG. 8 another bit in the adaptive pattern is shown formed from $S_{850}$, $S_{650}$, $S_{450}$ and $-S_{250}$. The data binary 0 detected for sample bits $S_{200-399}$ is again considered as indicated by $-S_{250}$. Other algorithms can be used to compute an average adaptive pattern or other algorithms can be used to form a mean adaptive pattern. Similarly, other weighting considerations can be used in forming the adaptive pattern.

In FIG. 7 a circuit for forming the adaptive pattern of FIG. 8 includes a correlator 60, an adaptive pattern memory (shift register 62) and three additional shift registers 63, 64 and 65. Each of the shift registers for the example under discussion have 200 stages, the correlator 60 also has 200 stages. (The correlator 60 is shown receiving only an adaptive pattern in FIG. 7, it may be used this way or it may be used where it also receives a standard pattern as previously discussed). Four sample bits are applied to an averaging circuit 66, the output of the averaging circuit 66 (line 67) is coupled to the input of the shift register 62.

The sample bits of the received signal are coupled to the input of the correlator 60 and then after being clocked through the correlator are coupled to the multiplexer 70. The multiplexer 70 selects between the outputs of the correlator 60 and the complement of the sample bits which are inverted by inverter 71. The output of the multiplexer 70 forms one input to the averaging circuit 66 and an input to shift register 63. The output of shift register 63 forms another input to the averaging circuit 66 and an input to the shift register 64. The output of shift register 64 is the third input to the averaging circuit 66 and provides the input to the shift register 65. The output of the shift register 65 is the fourth input to the averaging circuit 66.

The multiplexer 70 is controlled by the counter 72. When a data binary 0 is detected, the counter 72 is set to a count of 200 and counts downward by one for each sample period. As long as the count in counter 72 is not 0, the multiplexer 70 selects inverter 71 as the input to the averaging circuit 66. Otherwise, the output of correlator 60 is directly coupled to the averaging circuit 66 through the multiplexer 70. While a separate counter is shown, in practice a counter or signal source for a bit clock may be used.

The averaging circuit 66 averages the four inputs, however, it weighs the input from the multiplexer 70 more heavily (by a factor of 2) than the other inputs as shown in FIG. 8. An ordinary logic circuit may be used for this purpose.

The operation of the circuit of FIG. 7 can be readily understood by noting that when sample bit $S_{600}$ is exiting correlator 60 it is also being coupled as one input to the averaging network 66 at the same time the output of the register 63 is $S_{400}$ since 200 sample bit periods earlier this sample bit was exiting the correlator 60. Similarly, the output of the register 64, $S_{200}$, and the output of the register 65, So, are also coupled to circuit 66 at this time. When $S_{200}$-$S_{399}$ were clocked from the correlator, the counter 72 was set causing the output of the inverter 71 to be selected, consequently, sample bits $S_{200}$-$S_{399}$ are all complemented.

Figure 11:
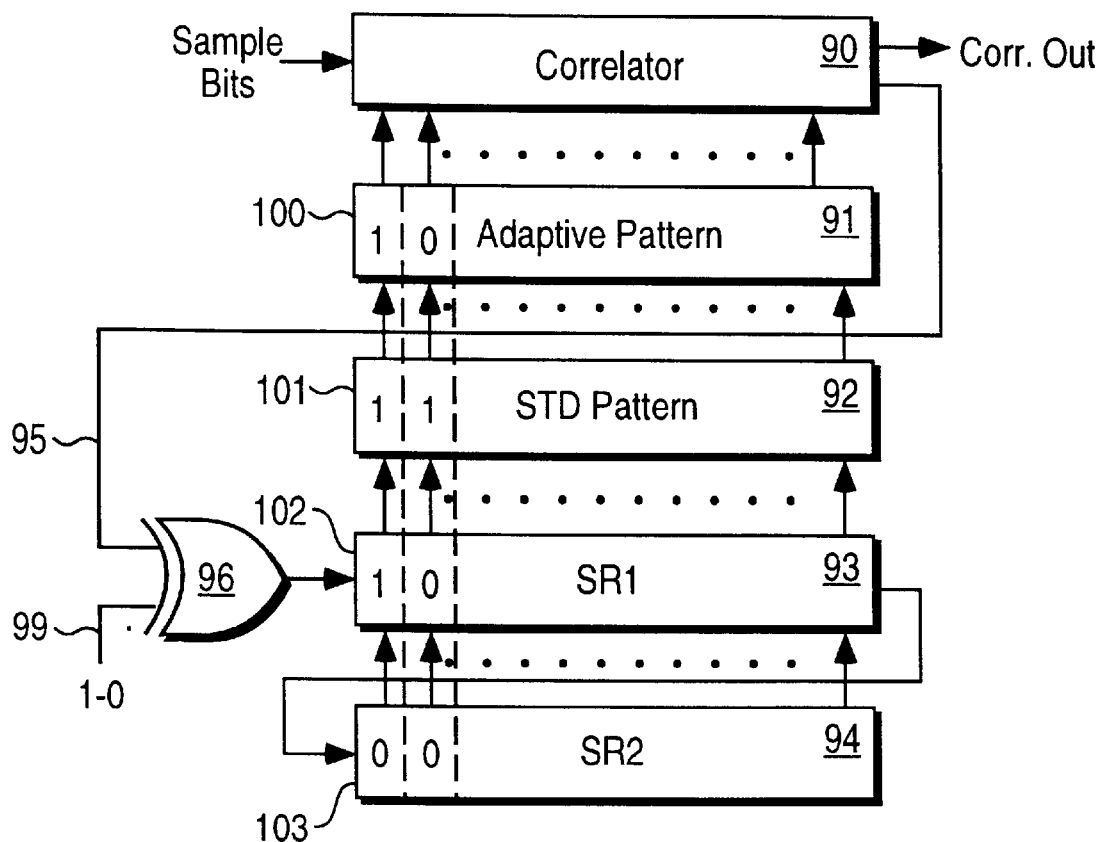
FIG. 11 is a block diagram of another embodiment of the present invention where an adaptive pattern is developed from the receive signal and a standard pattern.

In FIG. 11 another correlator 90 is shown which corresponds to the correlator 60 of FIG. 7. The contents of the correlator are correlated with a pattern stored in the adaptive pattern memory 91. A standard pattern such as the one stored in the standard pattern memory 30 of FIG. 4 is stored in the standard pattern memory 92 of FIG. 11. The sample bits of the received signal from the output of the correlator 90 are coupled through an exclusive OR gate 96 on line 95 to the input of a shift register 93. The output of the shift register 93 is coupled to the input of the shift register 94. For the example where a data bit time comprises 200 sample bits, the adaptive pattern memory and the standard pattern memory each store 200 bits and the shift registers 93 and 94 each have 200 stages.

As was the case with the embodiment of FIG. 7, as each sample bit is shifted from the correlator, it is shifted at the same frequency through the shift registers 93 and 94. The exclusive OR gate 96 performs the function of the inverter 71 and counter 72 of FIG. 7. In this embodiment when a data binary 0 is detected the input 99 to the exclusive OR gate 96 is a low signal 0 allowing the sample bits on line 95 to pass through the gate unchanged. When a data binary 1 is detected for this embodiment the sample bits are inverted since a high signal is applied to the line 99 for 1 data bit time (i.e., 200 sample bit periods).

Through ordinary logic the sample bits stored in the shift register are combined with the standard pattern on a stage-by-stage basis to provide the adaptive pattern stored in memory 91. The first memory location 101 of the memory 92 is illustrated storing a binary 1. Stage 102 of the shift register 93 is illustrated storing a sample bit binary 1 while the first state 103 of the register 94 is illustrated storing a binary 0. The bits in memory 101 and registers 102 and 103 are combined such that the majority state prevails and is transferred to memory location 100 of memory 91. Looked at another way, the standard pattern is used unless the bit stored in both the shift registers 93 and 94 are of the opposite state to the standard reference pattern. Another example is illustrated for the second stage where the registers 93 and 94 store binary 0's and the standard pattern has a binary 1 in the second memory location. For this condition, the second memory location of memory 91 is a binary 0, which is used for the correlation.

The more history used in forming the adaptive pattern, the more likely that a data bit misdetection will occur when there is an abrupt change in the channel distortion. Note for the "majority" voting just discussed, one data bit time is required to return to the reference pattern from an adaptive pattern derived from the sample bits to the standard references. However, two data bit times are required to change from the standard reference pattern to the adaptive pattern when there is an abrupt change that increases distortion. The weighting factor discussed in connection with FIG. 7 and 8 helps the transition from one pattern to another occur more quickly. An error correcting code or other error correcting mechanism which can correct the possible number of bad data bits upon transition may be used to make the detection more robust. Alternately, when the transitions are periodic, their occurrence can be anticipated and the change from or to the standard patterns can occur without delay. (See FIG. 6, lines 56 and 57).

While shift registers are shown in FIGS. 7 and 8 for storing sample bits, a random-access memory may be used to store the sample bits.

INVERSION OF PREDETERMINED BITS FOR ALTERNATE PATTERN

Figure 9:
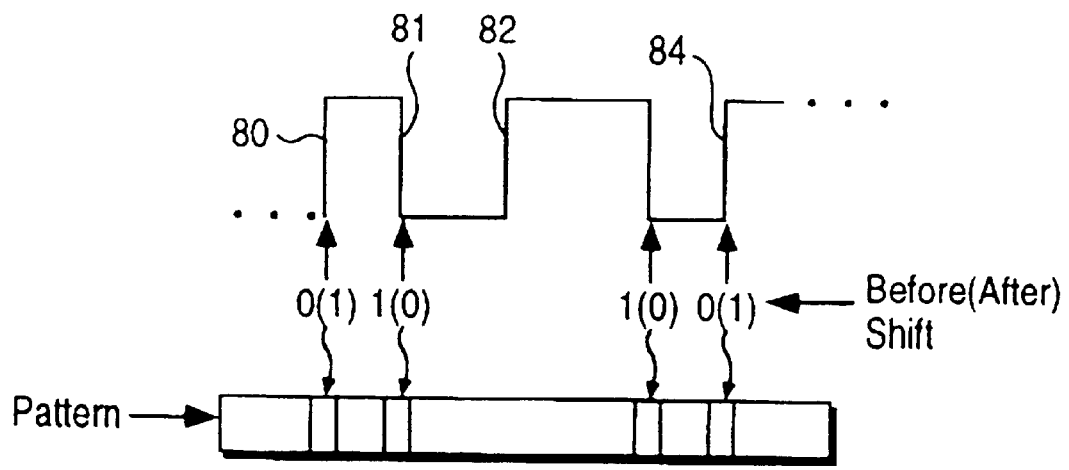
FIG. 9 is a diagram used to describe another embodiment of the present invention.

In FIG. 9 the received signal is shown quantized in amplitude to one bit. That is, one phase of the carrier is shown as one binary state and the other phase as the other binary state. This representation includes a plurality of transitions, such as transition 81 and 82 shown in FIG. 9. For example, the transition occurs where the carrier changes phase. Between transitions 81 and 82 the pattern is 0 for each of the samples, between transitions 82 and 83 the pattern is all 1 s. As can be appreciated, at the transitions there can be an ambiguity depending on the relationship between the sample clock and carrier signal. Slight changes in the time of a transition, for instance, caused by distortion on the power line, can change the transition from occurring before a sample time to after a sample time. The standard pattern is generally determined assuming a fixed sample clock at a given phase, say 0°. To identify these sensitive transitions the sample clock is shifted, for instance by 90°, and the pattern for an ideal waveform redetermined. The pattern before the shift and the pattern after the shift can be compared to identify the sensitive bits in the pattern. For instance, in FIG. 9 transitions 80, 81, 83 and 84 illustrate where a bit change occurred with a shifted sample clock. Note, no change occurred for transition 82.

Figure 10:
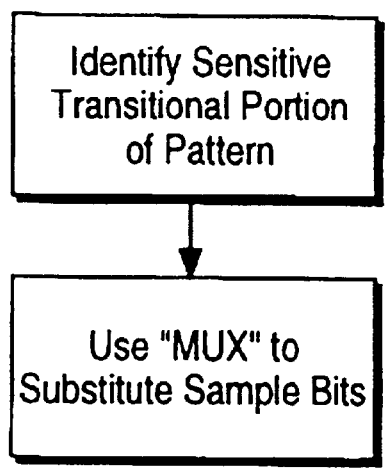
FIG. 10 illustrates the method employed for using the embodiment of FIG. 9.

An alternate pattern which compensates for distortion changes the bits in the pattern identified as being sensitive. For instance, a standard pattern includes a 0 at transition 80, a 1 at transition 81, a 1 at transition 83 and a 0 at transition 84. The alternate pattern includes a 1 at transition 80, 0 at transition 81, 0 at transition 83 and a 1 at transition 84. Only those bits which are identified as being sensitive are changed for the alternate pattern, the remainder of the bits remain the same. (See first step of FIG. 10.) This allows a relatively simple circuit such as a multiplexer to be used to change these identified bits in the pattern. (See second step of FIG. 10.)

The embodiment of FIG. 9 can be used for a different reason. To save hardware assume every other stage of the correlator is removed, every other sample bit is dropped and the frequency of operation is cut in half (compared to FIGS. 4 and 5). For the most part, data bit detection will occur just as well but for the information lost at the transition. The muxing of the pattern bits occurring at the transitions as discussed above, to a large extent, overcomes this information loss.

What is claimed is:

1. In a spread spectrum receiver where a received signal having transitions is correlated with a reference pattern having predetermined bit state changes at anticipated transitions of the received signal so as to detect binary data, an improvement comprising:

changing the state of the bits at the transitions and correlating the reference pattern and the received signal with the changed bits so as to compensate for distortion in the received signal.

2. In a spread spectrum receiver where a received signal is correlated with a predetermined reference pattern to detect binary data, an improvement method comprising the steps of:

identifying a plurality of bits in the reference pattern occurring approximately at transitions of the received signal;

substituting the bits with other bits to provide an alternate pattern; and, using the alternate pattern in a correlation with the received signal.

* * * * *